United States Patent
Hall et al.

[19]

[11] Patent Number: 5,931,185
[45] Date of Patent: Aug. 3, 1999

[54] AIR HOSE STORAGE ASSEMBLY FOR INFLATORS AND METHOD FOR HANDLING AN INFLATOR AIR HOSE

[75] Inventors: Roberta Scheiner Hall, Needham, Mass.; Scott D. Price, Singapore, Singapore; Wallis Alsruhe, Millers, Md.; Robert G. Frederick, Charlotte, N.C.

[73] Assignee: Black & Decker, Inc., Newark, Del.

[21] Appl. No.: 08/695,146

[22] Filed: Aug. 8, 1996

[51] Int. Cl.$^6$ ........................................... A62C 35/00
[52] U.S. Cl. .................. 137/355.16; 239/195; 137/223; 137/355.28
[58] Field of Search ............... 137/355.16, 355.2, 137/355.12, 899.1, 355.19, 223, 355.28; 239/195, 197; 248/51, 52, 75; 174/135, 69, DIG. 9; 226/118, 19; 242/388.9

[56] References Cited

U.S. PATENT DOCUMENTS

| | | |
|---|---|---|
| 2,157,887 | 5/1939 | Davis . |
| 2,168,951 | 8/1939 | Caldwell . |
| 2,266,334 | 12/1941 | Rice ......................................... 239/195 |
| 2,367,141 | 1/1945 | Rosenblum ......................... 137/355.16 |
| 2,993,503 | 7/1961 | Pokryfke et al. ........................ 239/195 |
| 3,911,944 | 10/1975 | Hukuba et al. ....................... 137/355.2 |
| 3,939,862 | 2/1976 | Booth .................................. 137/355.16 |
| 4,570,855 | 2/1986 | Johnston ................................... 239/195 |
| 4,776,766 | 10/1988 | Brent . |
| 4,969,493 | 11/1990 | Lee . |
| 4,981,162 | 1/1991 | Grenie et al. . |
| 5,294,029 | 3/1994 | Shimura et al. . |
| 5,450,874 | 9/1995 | Hamula . |

FOREIGN PATENT DOCUMENTS

| | | | |
|---|---|---|---|
| 615151 | 10/1926 | France | ............................... 137/355.16 |

*Primary Examiner*—Denise L. Ferensic
*Assistant Examiner*—John Ball
*Attorney, Agent, or Firm*—Oppenheimer, Wolff & Donnelly, LLP

[57] ABSTRACT

Instead of wrapping the air hose around the portable tire inflator housing to store it, an internal storage compartment is provided. A guide device in the compartment guides the hose so that it travels a path which is offset downward from a straight line path between its attachment to the compressor of the inflator and the opening in the compartment top wall. This path reduces pulling stresses on the attachment, assists in manual incremental feed of the hose back into a concealed storage position, and prevents the hose from bunching up into upper corners of the compartment. When in its storage position only the air chuck at the end of the hose is exposed.

46 Claims, 4 Drawing Sheets

AIR HOSE STORAGE ASSEMBLY FOR INFLATORS AND METHOD FOR HANDLING AN INFLATOR AIR HOSE

BACKGROUND OF THE INVENTION

The present invention relates to portable tire inflators or pumps and devices for storing their air hoses.

Many portable air pumps for inflating vehicle tires are known. Examples thereof are disclosed in U.S. Pat. Nos. 4,776,766 (Brent), 4,614,479 (Liu), and 4,080,105 (Connell). (The entire disclosures of each of these patents are hereby incorporated by reference.) Another portable tire inflator is the 120 volt 9527 AIR STATION® inflator, available from The Black & Decker Corporation of Towson, Maryland.

None of the known inflators has a good way of storing and quickly accessing their air hoses. For example, the AIR STATION® inflator has a groove at its base into which the 120 volt electric cord and the air hose are wrapped. The hose is thereby exposed, susceptible to damage and presents an unattractive appearance. Also, air hoses having a "memory" can be difficult and cumbersome to quickly wrap into a storage position.

SUMMARY OF THE INVENTION

Directed to remedying the problems of the prior art, an improved air hose storage assembly is disclosed herein. The storage assembly includes a storage compartment in which the air hose is enclosed when in a storage position. The hose is attached at one end to the compressor of the inflator, passes around a guide device mounted in the storage compartment, and then passes up and out an opening in the top of the compartment. An air chuck is secured to the opposite end of the hose outside of the compartment.

When the hose is in a fully extended position (for inflating a tire), the hose wraps around the lower surface of the guide device. Thereby if the hose is yanked out hard, all of the pulling force is not directly on the hose attachment to the compressor.

To return the hose from its extended position to a storage position in the compartment, the hose is manually pushed incrementally through the top opening down into the compartment. Without the guide device, the hose may resist the pushing force if the force is directed along the axis of the hose in a direct linear path between the top opening and the attachment. Advantageously, the guide device prevents this linear path. Also, by directing the pushed-in hose downward into the compartment (and not upward relative to the attachment), the guide device prevents the hose from bunching up into upper corners of the compartment.

Other objects and advantages of the present invention will become more apparent to those persons having ordinary skill in the art to which the present invention pertains from the foregoing description taken in conjunction with the accompanying drawings.

DETAILED DESCRIPTION OF PREFERRED EMBODIMENTS OF THE INVENTION

Figure 1:
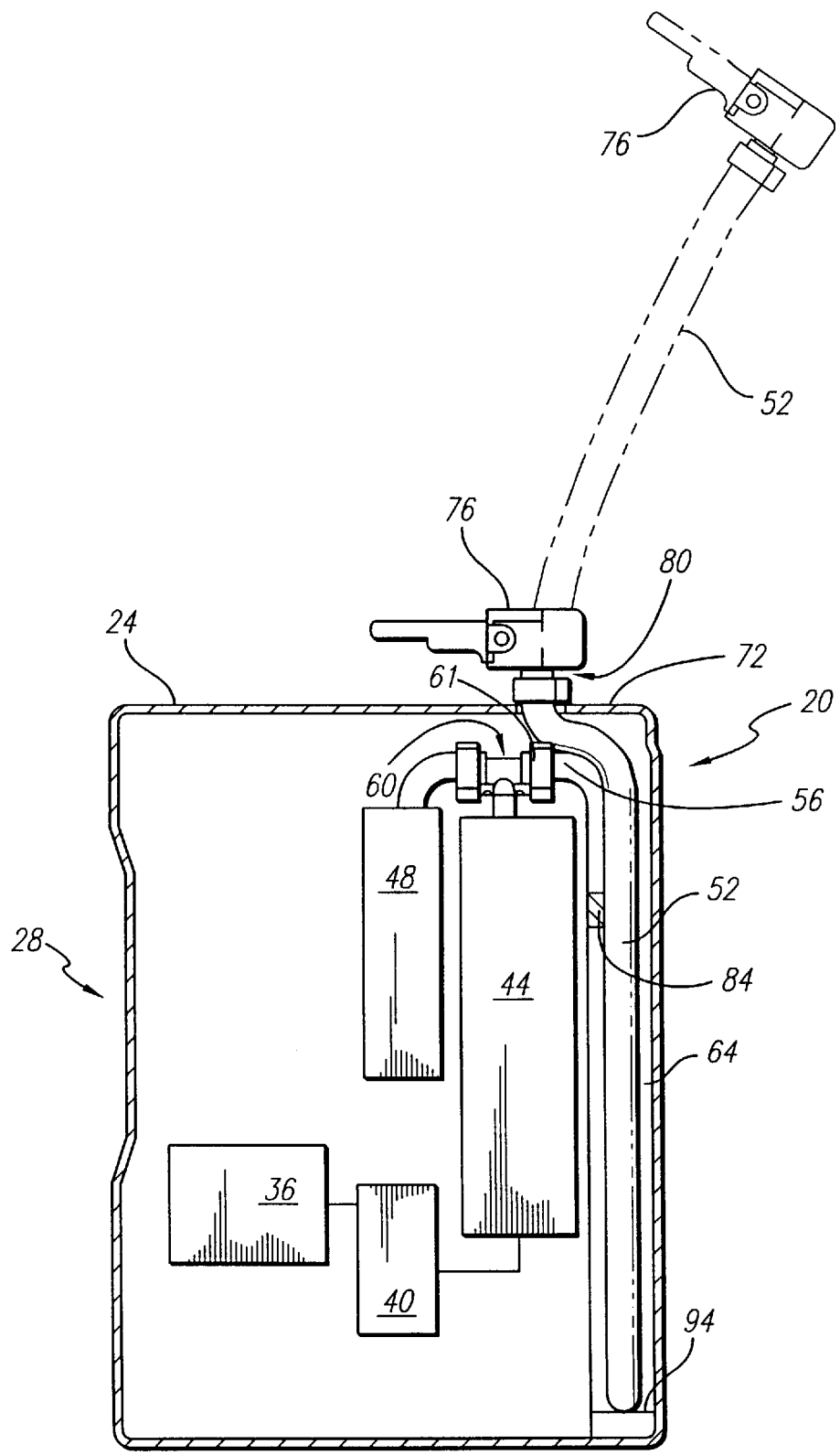
FIG. 1 is a side elevational view of the interior of a tire inflator assembly showing an internal hose storage compartment of the present invention.
Figure 4:
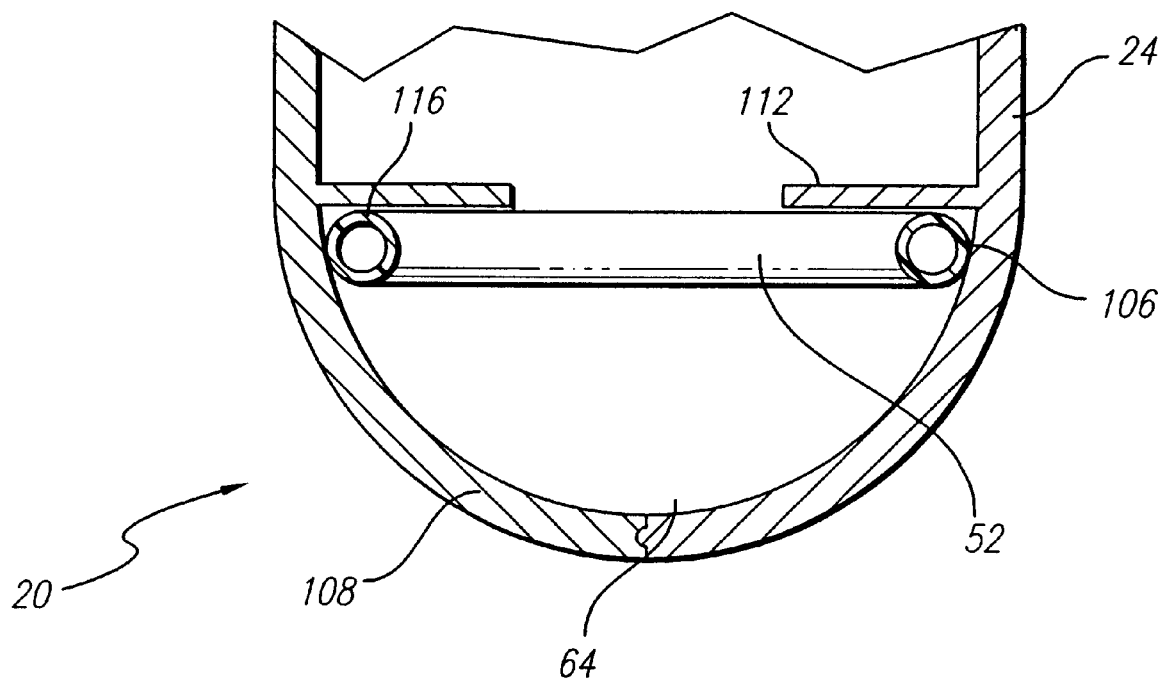
FIG. 4 is a horizontal sectional view through FIG. 3.

Referring to the drawings, an air hose storage assembly of the present invention is shown generally at 20. Storage assembly 20, as shown in FIGS. 1 and 4, can be formed as an integral, structural part of the housing 24 of a portable tire inflator depicted generally at 28.

The inflator 28 is shown for environmental purposes and exemplary components are illustrated therein in block-type format. They include a motor 36, a gear box 40, a compressor or piston pump 44, and a gauge 48. Other components or constructions of inflator 28 as would be apparent to those skilled in the art from this disclosure are within the scope of the invention. In fact, as will become apparent, generally all inflators can be adapted to include the present air hose storage assembly (20).

The proximal end 56 of the air hose 52 is attached via an attachment shown generally at 60 to the compressor 44. The attachment 60, for example, can be a securing of the hose end 56 onto a nipple of an end of a "T" or "Y" fitting mounted to the compressor 44. The hose end 56 is secured in place on the nipple with a wire or metal clamp 61.

The air hose 52 passes from the attachment 60 into a (nine inch high) compartment 64 (of the storage assembly 20) and out an opening 68 in the top wall 72 of the compartment. The air chuck 76 is attached to the hose end 80 outside of the compartment 64. An example of a usable air chuck 76 is that used in the previously-mentioned AIR STATION® inflator, and can have a conventional thumb lock lever. The air hose 52 can also be that used in that inflator, and for example can have a 9.6 millimeter diameter and a twenty-one inch total length.

Figure 2:
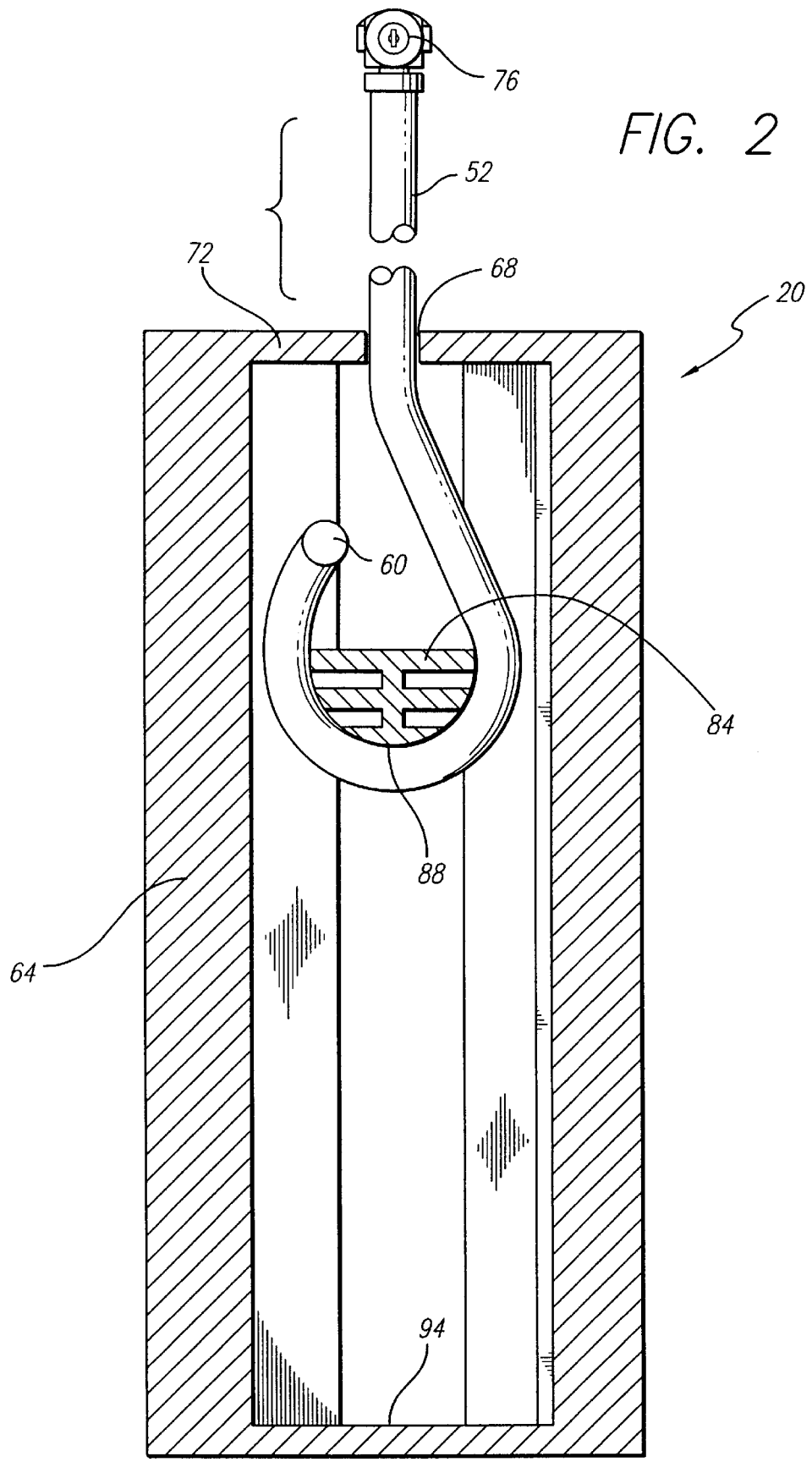
FIG. 2 is an enlarged right side elevational view of the interior of the compartment of FIG. I and shows the air hose in an extended position.
Figure 3:
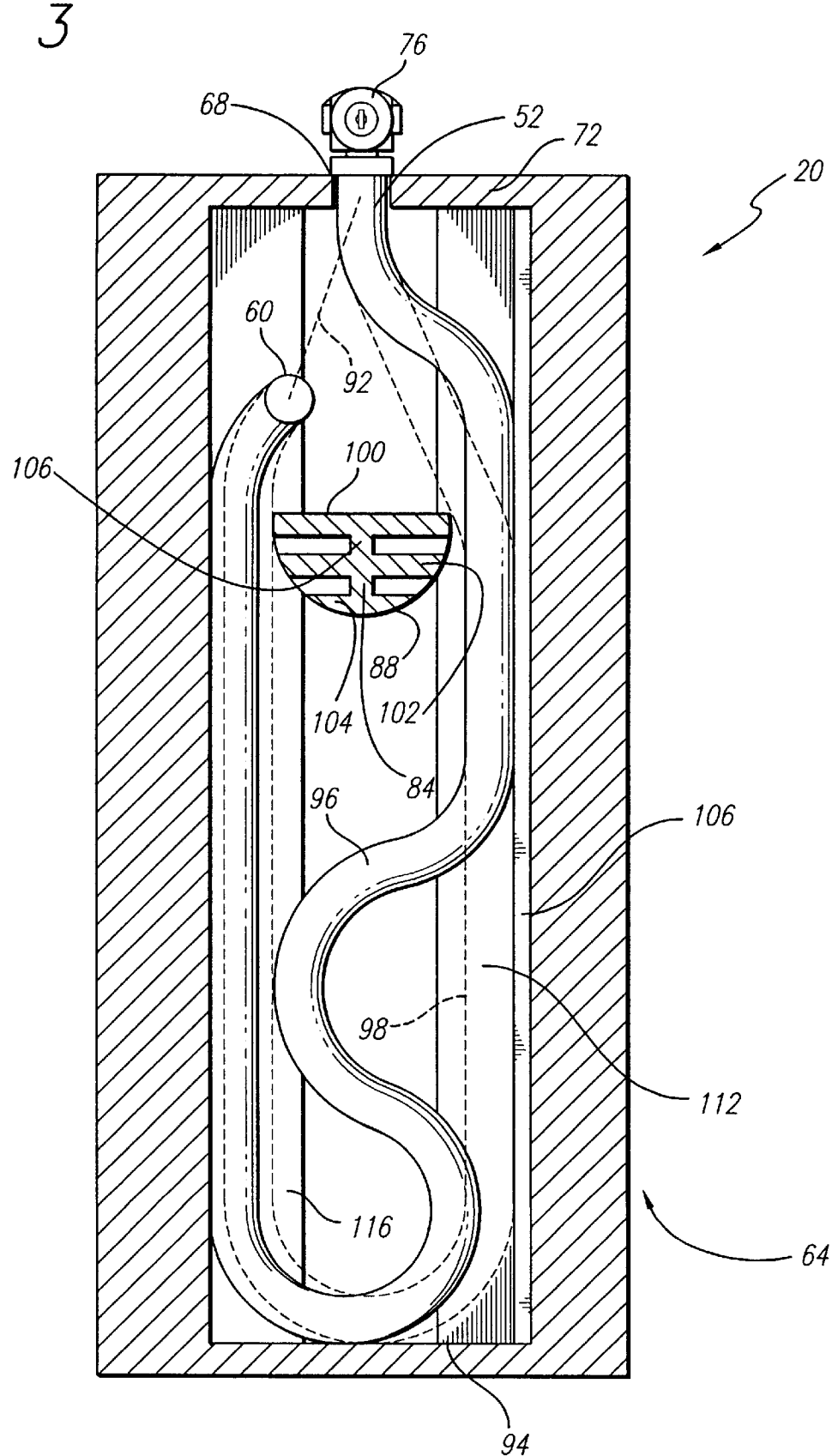
FIG. 3 is a view similar to FIG. 2, showing the hose in alternative storage positions.

Mounted in the compartment 64 is a guide device 84, as best shown in FIGS. 2 and 3. The guide device 84 is positioned so that its lower surface 88 is positioned below a straight line path 92 (FIG. 3) between the attachment 60 and the opening 68, and also generally between the attachment and opening. The air hose 52 passes down and around the lower surface 88.

Thereby, when the air hose 52 is fully extended out of the compartment 64 by pulling out on the air chuck 76, the hose engages up against the lower surface 88 and travels a path as shown in FIG. 3. If the hose 52 is yanked out hard, the guide device 84 thus reduces the likelihood that the hose will be pulled out of attachment 60. When fully extended, approximately eleven inches of the hose 52 is outside of the compartment, and together with the height of the tool and chuck 76 allows fifteen inch tires (not shown) to be inflated with their valve stems at the top.

When the hose 52 is in a (fully or partially) extended position relative to the compartment 64 (such as shown in FIG. 2), and it is to be stored in a storage position in the compartment, it is simply pushed in through the top opening 68. That is, it is manually fed incrementally into the compartment 64 until only the chuck 76 is exposed; no retraction means is provided. The guide device 84 assists in this manual feed. It directs the hose 52 away from a feed directly along and against the straight line path 92. It also directs it downwardly towards the floor 94 of the compartment 64, thereby preventing the hose 52 from bunching up in the upper corners of the compartment.

The configuration the hose 52 assumes depends, inter alia, on the length of the hose, the internal dimensions of the compartment 64, and the flexibility of the hose. FIG. 3 illustrates two alternative configurations—one includes an "S" shape 96 and the other includes a simple elongate "U" shape shown in dotted lines at 98. The "S" shape 96 accommodates longer hoses or smaller compartments. Although the "S" shape 96 is pictured as including upper and lower oppositely curving portions of equal size, it is more likely that the upper portion will be larger, with a more gradual curve.

A preferred construction of the guide device 84 is illustrated in FIGS. 2 and 3. It is formed with three horizontal ribs or fins 100, 102, 104 connected together and spaced apart by a central upright rib 106. The outer surfaces of the ribs form the guide surface 88, and particularly the outer ends of ribs 100 and 102 and the entire lower surface of rib 104. The guide surface 88 is depicted as a semicircle (or, in three dimensions, the lower half of a cylinder). The top rib 100 extends across the diameter of the semicircle, and the diameter can be twelve millimeters or approximately one inch.

The guide device 84 is formed in a casting process out of zinc. The above-described ribbed construction of the guide device 84 makes for a lighter and less material-costly unit, and is made pursuant to good casting practice.

To assist in feeding and guiding the hose 52 into either of the storage positions, a vertical rib 106 is formed on the interior surface of the sidewall 108 of the compartment, as depicted in FIG. 4. Together with the adjacent backwall wall member 112, a pocket or guide slot in which the hose 52 slides is defined. The left side of the hose 52 rolls into the cavity defined between the opposite wall member 116 and the adjacent portion of the sidewall 108. As shown, the wall members 112 and 116 do not extend to the center. Rather, their ends are spaced about one inch apart.

Referring still to FIG. 4, the sidewall 108 is formed with a clam shell housing construction, injection molded from ABS plastic. The two parts come together to define an enclosure for the hose 52.

In other words, the hose 52, when in its storage position, is fully enclosed and protected, and hidden from view, providing a neat and clean appearance. It can be quickly pulled out to its extended position for use without any cumbersome unwinding action needed, and without being pulled from its attachment. It also can be quickly fed back into the compartment, without getting caught or tangled up therein. An easy and efficient hose storage means is thereby provided.

From the foregoing detailed description, it will be evident that there are a number of changes, adaptations and modifications of the present invention which come within the province of those skilled in the art. However, it is intended that all such variations not departing from the spirit of the invention be considered as within the scope thereof, as limited solely by the claims appended hereto.

What is claimed is:

1. An air hose storage assembly, comprising:
   an air hose storage compartment for an inflator, said compartment having a hose opening at an upper location thereof;
   a flexible pressurized air hose having one end operatively connectable to the inflator at a hose attachment, said hose having an opposite end, said hose passing through said hose opening;
   an air chuck attached to said opposite end and disposed outside of said compartment; and
   a guide device positioned in said compartment and guiding at least in part said hose along a path offset a distance below a straight line between the hose attachment and said hose opening when said hose is in an extended position relative to said compartment;
   wherein said guide device comprises a plurality of fins whose outer surfaces define a curved guide surface for said hose.

2. The storage assembly of claim 1 wherein said guide device is positioned generally between the hose attachment and said hose opening and below the straight line.

3. The storage assembly of claim 1 wherein said guide device is fixed relative to said compartment and guides said hose away from upper corners of said compartment as said hose is manually push fed incrementally through said opening from the extended position into a storage position in said compartment.

4. The storage assembly of claim 1 wherein said curved guide surface defines a cylindrical surface.

5. The storage assembly of claim 1 wherein said fins are formed as a unitary cast structure.

6. The storage assembly of claim 1 wherein the inflator comprises a portable tire inflator.

7. An air hose storage assembly, comprising:
   an air hose storage compartment configured for an inflator, said compartment having a hose opening at an upper location thereof;
   a flexible pressurized air hose having one end operatively connectable to the inflator at a hose attachment, said hose having an opposite end, said hose passing through said hose opening;
   an air chuck attached to said opposite end and disposed outside of said compartment; and
   a guide device fixedly mounted to said compartment and guiding at least in part said hose along a path offset a distance below a straight line between the hose attachment and said hose opening when said hose is in an extended position relative to said compartment;
   said compartment has a top wall through which said hose opening passes;
   said compartment includes an arcuate side wall to which said top wall is mounted; and
   said compartment includes rear wall members projecting inwardly in opposing directions from said side wall.

8. An air hose storage assembly, comprising:
   an air hose storage compartment configured for an inflator, said compartment having a hose opening at an upper location thereof;
   a flexible pressurized air hose having one end operatively connectable to the inflator at a hose attachment, said hose having an opposite end, said hose passing through said hose opening;
   an air chuck attached to said opposite end and disposed outside of said compartment; and
   a guide device fixedly mounted to said compartment and guiding at least in part said hose along a path offset a distance below a straight line between the hose attachment and said hose opening when said hose is in an extended position relative to said compartment, said guide device includes a plurality of fins whose outer surfaces define a curved guide surface for said hose.

9. The storage assembly of claim 8 wherein said curved guide surface defines a cylindrical surface.

10. The storage assembly of claim 8 wherein said fins are formed as a unitary cast structure.

11. An air hose storage assembly, comprising:
    an air hose storage compartment for an inflator, said compartment having a hose opening at an upper location thereof;

a flexible pressurized air hose having one end operatively connectable to the inflator at a hose attachment, said hose having an opposite end, said hose passing through said hose opening;

an air chuck attached to said opposite end and disposed outside of said compartment; and a guide device fixedly positioned in said compartment and guiding at least in substantial part said hose along a path offset a distance below a straight line between the hose attachment and said hose opening when said hose is in an extended position relative to said compartment;

said hose in its normal hose storing procedure being adapted to be manually push fed without counterweight assistance incrementally through said opening from the extended position to a normal hose storage position in said compartment; and said guide device guiding said hose away from upper corners of said compartment during the normal hose storing procedure.

12. The storage assembly of claim 11 wherein said guide device is positioned generally between the hose attachment and said hose opening and below the straight line.

13. The storage assembly of claim 11 wherein said compartment includes a sidewall and a vertical hose guide rib on an interior surface of said sidewall.

14. The storage assembly of claim 13 wherein said compartment includes a rear wall and a floor, said rear wall and said rib define guide surfaces for said hose when being manually push fed into said compartment from the extended position to the storage position along a feed path between said opening and a lower surface of said compartment.

15. The storage assembly of claim 11 wherein said guide device is mounted in a fixed position relative to said compartment.

16. The storage assembly of claim 11 wherein said compartment includes a sidewall and a vertical hose guide rib on an interior surface of said sidewall; and said compartment includes a rear wall and a floor, said rear wall and said rib define guide surfaces for said hose when being manually push fed incrementally during the normal hose storing procedure along a feed path between said opening and a lower surface of said compartment.

17. The storage assembly of claim 11 wherein the inflator is a portable tire inflator.

18. An air hose storage assembly, comprising:

an air hose storage compartment configured for an inflator, said compartment having a hose opening at an upper location thereof;

a flexible pressurized air hose having one end operatively connectable to the inflator at a hose attachment, said hose having an opposite end, said hose passing through said hose opening;

an air chuck attached to said opposite end and disposed outside of said compartment; and a guide device fixedly mounted to said compartment and guiding at least in part said hose along a path offset a distance below a straight line between the hose attachment and said hose opening when said hose is in an extended position relative to said compartment, said guide device being spaced a distance below the hose attachment such that a free flexible portion of said hose is positioned between the hose attachment and said guide device.

19. The storage assembly of claim 18 wherein said guide device is spaced horizontally a distance from a closest surface of the hose attachment.

20. The storage assembly of claim 18 wherein in a normal hose storing procedure, said hose is manually push fed without counterweight assistance incrementally from the extended position into a normal storage position in said compartment.

21. The storage assembly of claim 20 wherein said guide device guides said hose during the normal hose storing procedure away from upper corners of said compartment.

22. The storage assembly of claim 18 wherein said guide device comprises a post extending perpendicularly out from a mounting wall of said compartment.

23. The storage assembly of claim 22 wherein said post has a lower guide surface around which said hose wraps when in the extended position.

24. The storage assembly of claim 23 wherein said hose when in the extended position extends directly upwardly from said guide surface to said hose opening.

25. The storage assembly of claim 18 wherein said hose during at least a substantial portion of its normal hose storing procedure is out of contact with and spaced a distance from said guide surface.

26. The storage assembly of claim 18 wherein said hose has a cross-sectional hose diameter, and said guide device defines a curved guide surface having a curvature diameter which is greater than the hose diameter.

27. The storage assembly of claim 18 wherein said hose extends directly horizontally away from the hose attachment and then curves downwardly.

28. The storage assembly of claim 18 wherein said guide device has a guide surface around which said hose wraps when in the extended position, said hose extending substantially downwardly where said hose first contacts said guide surface from the hose attachment and extends where said hose last contacts said guide surface substantially upwardly towards said hose opening.

29. The storage assembly of claim 18 wherein said guide device has a hose guide surface which defines a cylindrical surface of a cylinder whose axis extends horizontally.

30. The storage assembly of claim 18 wherein the inflator is a portable tire inflator.

31. The storage assembly of claim 18 wherein said guide device is spaced a distance below and out of contact with the hose attachment.

32. The storage assembly of claim 18 wherein a portion of said hose at said guide surface defines the lowest portion of said hose in said compartment when said hose is in the extended position.

33. The storage assembly of claim 18 wherein said guide device is disposed directly below said hose opening.

34. The storage assembly of claim 18 wherein said hose when in a storage position in said compartment lies substantially in a first vertical plane in said compartment, and said guide device and said hose opening lie in a second vertical plane perpendicular to said first vertical plane.

35. The storage assembly of claim 18 wherein said hose, when in a storage position in said compartment, defines a substantially vertical "S" shape in said compartment.

36. The storage assembly of claim 18 wherein said hose has a diameter of generally 9.6 millimeters and a length of generally twenty-one inches.

37. The storage assembly of claim 18 wherein said hose when in a storage position in said compartment defines a vertical "U" shape extending a substantial interior height of said compartment.

38. An air hose storage assembly, comprising:

an air hose storage compartment configured for an inflator, said compartment having a hose opening at an upper location thereof;

a flexible pressurized air hose having one end operatively connectable to the inflator at a hose attachment, said hose having an opposite end, said hose passing through said hose opening;

an air chuck attached to said opposite end and disposed outside of said compartment; and a guide device fixedly mounted to said compartment and guiding, by engagement of said hose on and around a guide surface of said guide device, at least in substantial part said hose along a path offset a distance below a straight line between the hose attachment and said hose opening when said hose is in an extended position relative to said compartment;

wherein when said hose is in the extended position, a portion of said hose at said guide surface defines the lowest portion of said hose in said compartment.

39. The storage assembly of claim 38 wherein said guide device is disposed at a generally central location of said compartment, a distance spaced below the hose attachment and a distance spaced above a bottom of said compartment.

40. The storage assembly of claim 38 wherein said hose enters said compartment from the hose attachment at an upper location of said compartment, spaced a distance above said guide device.

41. The storage assembly of claim 38 wherein said guide device comprises a horizontal post fixedly mounted in and to said compartment.

42. An inflator hose handling method, comprising the steps of:

providing an inflator hose storage compartment having a compartment interior, a hose opening at an upper location thereof and a guide device fixedly mounted in the compartment interior;

providing a flexible pressurized air hose having one end operatively connected at a hose attachment relative to an inflator and passing from the compartment interior out through the hose opening;

providing an air chuck attached to an end of the hose outside of the compartment;

manually pulling the hose out through the hose opening to an extended position relative to the compartment, said pulling including the guide device guiding the hose along a path at least in part offset a distance below a straight line between the hose attachment and the hose opening; and after said pulling step, manually pushing incrementally and without counterweight assistance the hose from the extended position to a storage position in the compartment interior, said pushing including the guide device guiding the hose away from upper corners of the compartment.

43. The method of claim 42 wherein the hose when in the extended position wraps around a lower surface of the guide device, and when in the storage position does not wrap around the lower surface.

44. The method of claim 42 wherein the guide device is a post fixedly mounted horizontally in and to the compartment.

45. The method of claim 42 wherein the inflator comprises a portable tire inflator.

46. The method of claim 42 wherein when the hose is in the extended position, a portion thereof at the guide surface defines the lowest portion of the hose in the compartment.

* * * * *